US00RE34948E

United States Patent [19]

Aizawa et al.

[11] E Patent Number: Re. 34,948

[45] Reissued Date of Patent: May 23, 1995

[54] ELECTROPHOTOGRAPHIC TYPE IMAGE FORMING APPARATUS

[75] Inventors: Hiroyuki Aizawa; Mitsuaki Maruyama; Shigeru Sawada; Yasuhiro Gyoutoku; Hiroshi Niki; Kouichi Higashimura; Kenji Aoki, all of Suwa, Japan

[73] Assignee: Seiko Epson Corporation, Tokyo, Japan

[21] Appl. No.: 294,085

[22] Filed: Jan. 6, 1989

Related U.S. Patent Documents

Reissue of:

[64] Patent No.: 4,754,293
Issued: Jun. 28, 1988
Appl. No.: 33,371
Filed: Apr. 2, 1987

[30] Foreign Application Priority Data

| | | | |
|---|---|---|---|
| Apr. 4, 1986 | [JP] | Japan | 61-77804 |
| Jul. 7, 1986 | [JP] | Japan | 61-159239 |
| Jul. 7, 1986 | [JP] | Japan | 61-159244 |
| Jul. 7, 1986 | [JP] | Japan | 61-159246 |

[51] Int. Cl.[6] ..... G01D 15/14

[52] U.S. Cl. ..... 347/138; 355/77; 355/321; 271/186

[58] Field of Search ..... 355/308, 309, 20, 50, 355/51, 64, 65, 77, 321; 271/186; 346/153.1, 160

[56] References Cited

U.S. PATENT DOCUMENTS

| | | | |
|---|---|---|---|
| 4,542,976 | 9/1985 | Kasamura . | |
| 4,575,221 | 3/1986 | Onoda et al. . | |
| 4,618,137 | 10/1986 | Boeve et al. | 355/3 SH |
| 4,627,716 | 12/1986 | Oka . | |
| 4,641,947 | 2/1987 | Ishida et al. . | |
| 4,664,504 | 5/1987 | Oda et al. . | |

FOREIGN PATENT DOCUMENTS

| | | |
|---|---|---|
| 20744 | 11/1970 | Australia . |
| 78019 | 3/1982 | European Pat. Off. . |
| 0285139 | 5/1988 | European Pat. Off. . |
| 0276910 | 8/1988 | European Pat. Off. . |
| 35504 | 4/1980 | Japan . |
| 142364 | 8/1980 | Japan . |
| 56-133747 | 10/1981 | Japan . |
| 147758 | 6/1983 | Japan . |
| 59-58444 | 4/1984 | Japan . |
| 59-133573 | 7/1984 | Japan . |
| 59-133577 | 7/1984 | Japan . |
| 59-157661 | 9/1984 | Japan . |
| 59-200273 | 11/1984 | Japan . |
| 61-32865 | 2/1986 | Japan . |
| 61-51160 | 3/1986 | Japan . |
| 61-56371 | 3/1986 | Japan . |
| 62-102258 | 5/1987 | Japan . |
| 62-134656 | 11/1987 | Japan . |

*Primary Examiner*—Richard L. Moses
*Attorney, Agent, or Firm*—Stroock & Stroock & Lavan

[57] ABSTRACT

An image forming apparatus employing a face-down delivery system in which the plane of the recording medium at any position relative to any other position assumed by the recording medium beginning with a stacking tray and ending with a delivery tray does not exceed 90°. The apparatus includes a detachable cartridge which includes a photosensitive member, a charging device and a cleaning device. In one preferred embodiment, register rollers and fixing rollers are positioned relative to each other such that a substantially zero angular deviation exists in the path traveled by the recording medium between these two pairs of rollers.

68 Claims, 8 Drawing Sheets

FIG. 10A
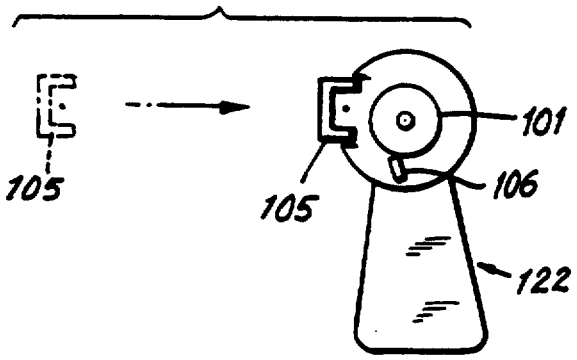
FIG. 10B
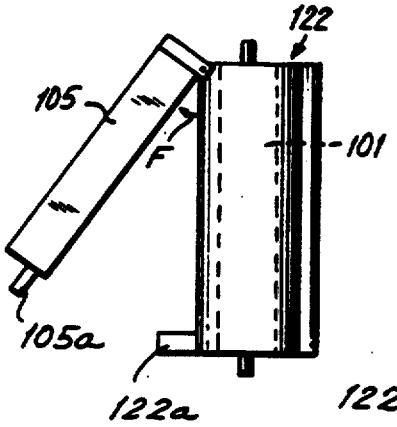
FIG. 10C
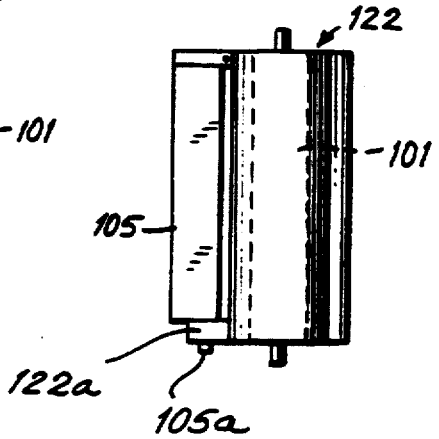
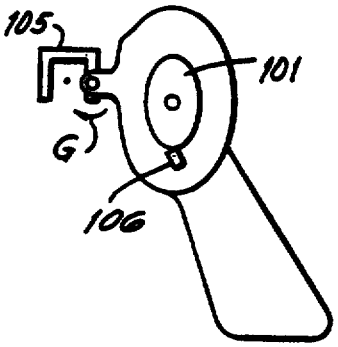
FIG. 10D
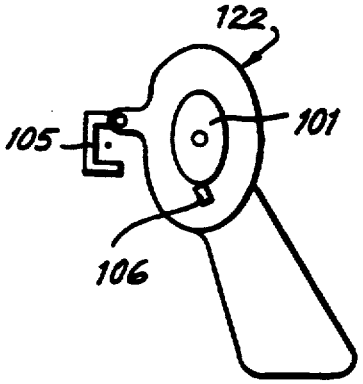
FIG. 10E

ELECTROPHOTOGRAPHIC TYPE IMAGE FORMING APPARATUS

Matter enclosed in heavy brackets [ ] appears in the original patent but forms no part of this reissue specification; matter printed in italics indicates the additions made by reissue.

BACKGROUND OF THE INVENTION

This invention relates generally to an image forming apparatus, and especially to an apparatus for forming images using a combination of an electrophotographic process and an optical signal generator, such as an optical printer or copier.

Generally, printers and copiers can be separated into two categories, namely, those using face-up and face-down delivery systems. In the face-up delivery system, an image reproduced from an original is formed on a sheet of paper (i.e., a copy) and is dispensed from the apparatus face up. Since, each additional copy is dispensed on top of the previous copy, when a stack of originals is reproduced, a corresponding stack of images will be dispensed with the copies of the tint and last originals at the bottom and top of the corresponding stack, respectively. The stack of images therefore, needs to be rearranged in order to place them in the same order as the stack of originals.

Face-down delivery systems overcome this drawback by dispensing each copy from the device face down. Therefore, a stack of originals and a stack of corresponding copies dispensed will be in the same paginal order.

Face-down delivery systems, however, are unable to reproduce images onto a recording medium such as an envelope or a piece of paper of equivalent or greater thickness without frequently curling and/or wrinkling such recording medium which often results in jamming the copier. More particularly, curling and/or wrinkling in a face-down delivery system is essentially due to the length of the path traveled by the recording medium (hereinafter referred to as "the paper transport path") and the two 90° bends typically found in the paper transport path.

Face-down delivery systems also suffer from increases in production cost and first print time (i.e., total time required for reproduction of an original beginning with the print command and ending with the discharge of the image from the device). The complexity of the path traveled by the recording medium for purposes of maintenance is also quite undesirable.

Both face-up and face-down delivery systems typically employ cartridges which include various components used in the electrophotographic process. These cartridges, however, are often difficult to reach for purposes of maintenance and/or repair thereof. Therefore, an exceedingly large floor space which may be well beyond the physical size of the printer or copier itself is required to ensure access to the cartridge as well as other internal pans of the copier.

Additionally, in order to clear paper jams in both face-down and face-up delivery systems, an operator is normally required to stoop down into an uncomfortable position while placing his or her hand within the copier. Quite often the hand becomes stained from, for example, toner waste and/or dust. Still further, inasmuch as most of the interior of the apparatus is not easily visible even while in a stooping position damage to a component of the copier can occur while attempting to clear the paper jam.

SUMMARY OF THE INVENTION

In accordance with the invention, an image forming apparatus and method therefor is provided which employs a face-down delivery system. The apparatus provides a path forming an angle of 90° or less for transporting the recording medium. In a preferred embodiment, the paper transport path forms a substantially straight line between a pair of register rollers (which advance the recording medium along the paper transport path) and a pair of fixing rollers (which fix the image onto the recording medium).

The apparatus includes a door pivotably mounted to the bottom of the apparatus housing. An operator can therefore open the door to view most, if not all, of the interior of the copier from a comfortable standing position. With the door closed, the paper transport path follows the interior length of the door resulting in a simple and direct path for the recording medium to travel.

Accordingly, it is an object of this invention to provide an improved image forming apparatus with production cost and installation space being substantially reduced and which is capable of forming images on abnormally thick paper, envelopes and the like using a face-down delivery system while significantly reducing the likelihood of jamming.

It is another object of the present invention to provide an image forming apparatus which significantly reduces the period of time to reproduce and deliver an image formed on a recording medium.

It is a further object of the present invention to provide an image forming apparatus with first print time being significantly reduced.

It is still another object of the present invention to provide an image forming apparatus which is designed to allow an operator to easily clear a paper jam while maintaining the operator's natural posture and without fear of staining the operator's hands or damaging the apparatus. The apparatus also allows the operator to easily exchange cartridges in a natural posture by performing almost the same operation as used for removing a paper jam.

Still other objects and advantages of the invention will in part be obvious and will in part be apparent from the specification.

The invention accordingly comprises the several steps and the relation of one or more of such steps with respect to each of the others, and the apparatus embodying features of construction, combinations(s) of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 10A, 10D and 10E are side elevational views and FIGS. 10B and 10C are top plan views of alternative embodiments of the present invention;

DETAILED DESCRIPTION OF THE PREFERRED EMBODIMENTS

Figure 1:
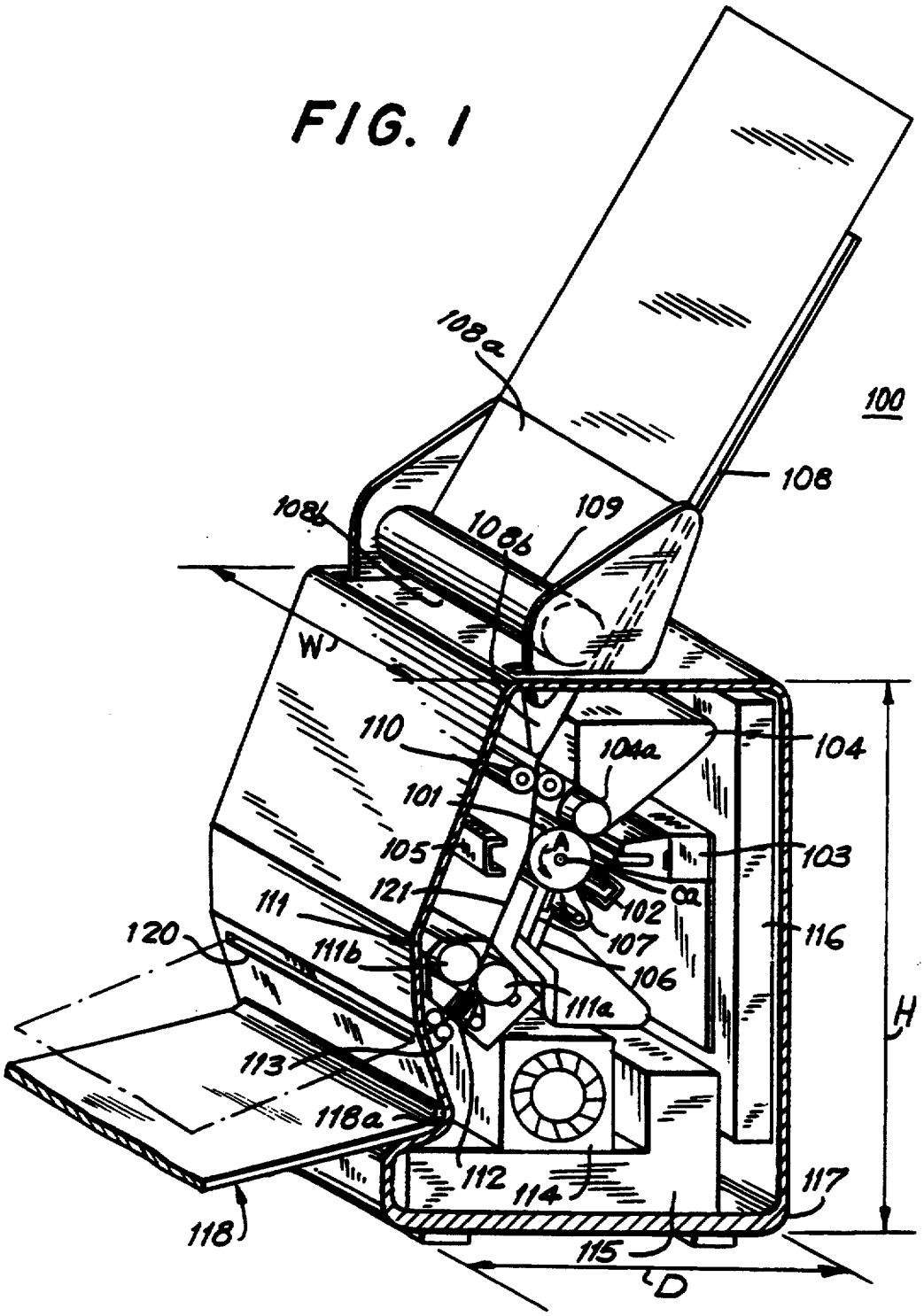
FIG. 1 is a fragmented perspective view partially in section of an image forming apparatus in accordance with one embodiment of the present invention.
Figure 2:
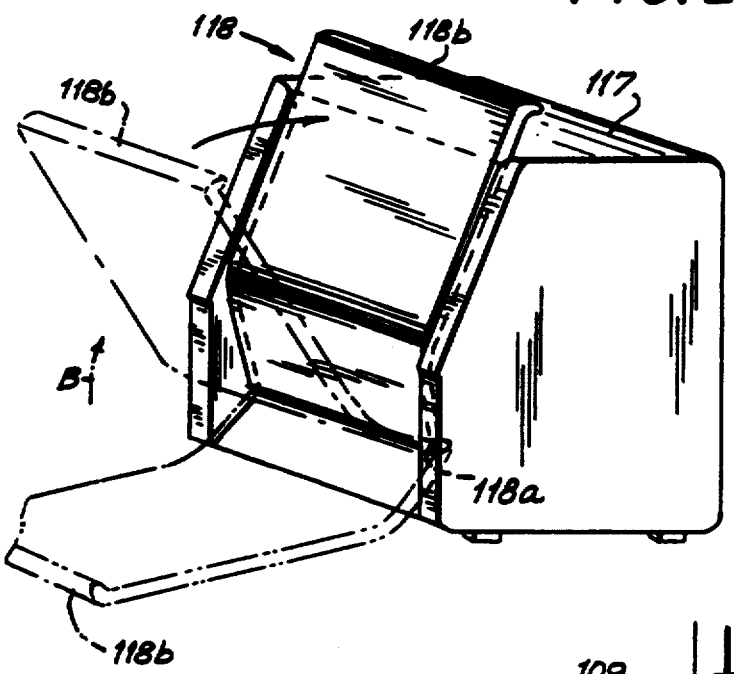
FIG. 2 is a diagrammatic perspective view of the apparatus of FIG. 1 illustrating the different positions of a delivery tray.

Referring now to FIG. 1, a electrophotographic image forming apparatus 100 comprises a photosensitive member 101 which rotates in the direction of arrow A, a charging device 102, an optical signal generator 103, a developing device 104, a transfer device 105, a cleaning device 106, and an erasing device 107. Apparatus 100 also comprises a paper stacker 108, a paper feed roller 109, register rollers 110, a fixing device 111, a paper guide plate 112, delivery rollers 113, an exhaust fan 114, a power supply 115, a control board 116, an outer casing 117, and a delivery tray 118. Casing 117 comprises a detachable door 123 and a housing (shown in detail in FIG. 5). Delivery tray 118, which is shown in greater detail in FIG. 2, is pivotably mounted along an axis 118a near the bottom of casing 117 and is operable so that its distal end 118b can be rotated in the direction of arrow B toward casing 117.

Referring once again to FIG. 1, photosensitive member [1] *101* has a surface area exhibiting the same characteristics as a photosemiconductor, that is, having a relatively high electric resistance when not exposed to light and having a relatively low electric resistance when light is applied thereto. Charging device 102, which comprises a fine metal wire and a ground electrode, is operable for generating a corona discharge by application of a high voltage of, for example, several kilovolts between the fine metal wire and ground electrode. Optical signal generator 103 generates optical signals having relatively short optical paths from a light source such as a liquid crystal shutter array or an LED array. The optical signals generated by generator 103 are produced in response to electrical image information provided by control board 116. More particularly, generator 103 converts the electrical signals supplied thereto by control board 116 into optical signals directed toward photosensitive member 101. If desired, a laser scanner rather than a liquid crystal shutter array or an LED array may be employed as the source of optical signals. Use of a laser scanner rather than a liquid crystal shutter or LED array, as discussed in detail below, results in a relatively longer optical path between generator 103 and photosensitive member 101.

Power supply [15] *115* includes a transformer as well as other heavy components and is therefore located in the lowermost part of apparatus 100. As can be readily appreciated, disposal of power supply 113 in the lowermost part of apparatus 100 is quite helpful for purposes of stabilizing the apparatus especially where casing 117 has a relatively small bottom area and is relatively tall.

Control board 116 serves to (i) provide control signals to optical signal generator 103, (ii) interface apparatus 100 with a host computer (not shown) and (iii) effect appropriate sequence control for elements within apparatus 100. Control board 116 is dimensioned approximately equal to A−4 size paper, and is therefore best positioned on the rear side of apparatus 100. Additionally, inasmuch as dust and toner accumulate inside and especially at and near the bottom of apparatus 100, and in order to avoid dust adhering to transfer device and optical signal generator 103 which can adversely effect their operation, it is highly desirable to position transfer device 105 and optical signal generator 102 other than the lowest portions of apparatus 100.

Figure 3:
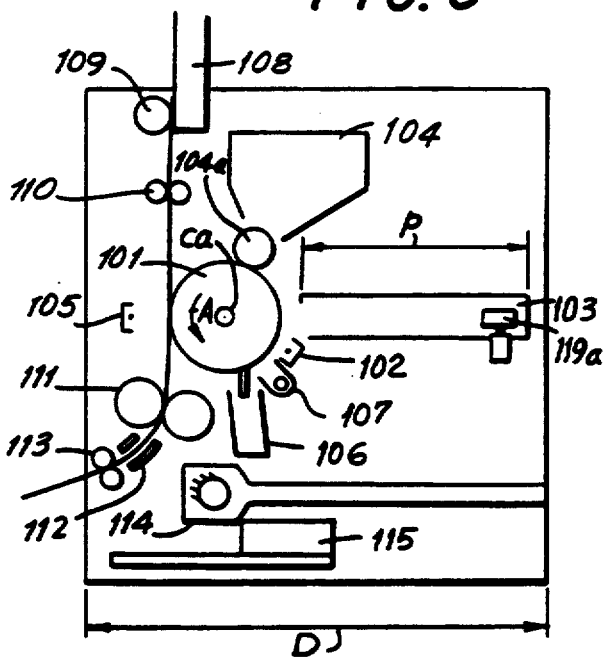
FIG. 3 is a diagrammatic side elevational view of FIG. 1.
Figure 4:
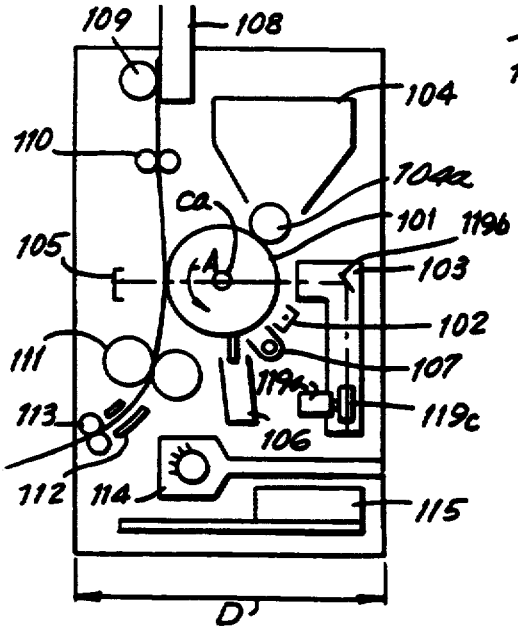
FIG. 4 is a diagrammatic side elevational view similar to FIG. 3 in accordance with an alternative embodiment of the present invention.

Optical signal generator 103 is positioned behind (*i.e., facing the rear of*) photosensitive member 101 so that the optical signal strikes photosensitive member 101 in a predetermined area of the latter. *Transfer device 105 is positioned on the side of photosensitive drum 101 opposite to optical signal generator 103 (i.e., in front of) as shown in FIGS. 3 and 4.* Preferably, the optical signal should strike photosensitive member 101 within a 60° range centered about a line (hereinafter referred to as the "horizontal line") which extends through a central axis (ca) of photosensitive member 101 and which is also normal to path 121. The horizontal line is normally parallel to the surface upon which apparatus 100 rests.

Casing 117 completely encompasses photosensitive member 101 and thereby blocks all ambient light from reaching photosensitive member 101. Therefore, unless an optical signal is produced by generator 103, the surface layer of photosensitive member 101 will act as an electrical insulator.

Apparatus 100 operates as follows: Photosensitive member 101 is rotated at a constant speed by a motor (not shown) which is driven by power source 115. Positive or negative electric charge associated with the corona discharge produced by charging device 102 adheres to the surface of photosensitive member 101 in all areas of the latter which have not been exposed to light. Initially, since photosensitive member 101 has not yet been exposed to any optical signals produced by generator 103, the entire outer surface of photosensitive member 101 acts as all electrical insulator. As member 101 continues to rotate in the direction of arrow A, certain areas of member 101 are then irradiated with light in accordance with the image information generated by optical signal generator 103. Thus on those irradiated areas, member 101 now acts like an electrical conductor grounding the charge adhering thereto. In other words, those portions of photosensitive member 101 which have been irradiated are no longer charged (forming a latent image on photosensitive member 101) while those portions which have not been irradiated are still electrically charged.

As photosensitive member 101 continues to rotate in the direction of arrow A, the latent image comes into contact with developing device 104 at a developing sleeve 104a of the latter. Developing device 104 contains charged toner which may be either positive or negative and which is communicated to photosensitive member 101 through developing sleeve 104a. Depending upon the charge of the toner and the charge on the non-latent image portions of photosensitive member 101, the toner will adhere to either the charged portion or uncharged portion (i.e., latent image) of photosensitive member 101. More specifically, when the charge on the surface of photosensitive member 101 and the charge of particles of the toner are both positive or both negative, the toner adheres to the noncharged portion of photosensitive member 101 (that is, the latent image areas). When the charge on the surface of photosensitive member 101 and the charged particles of the toner have opposite polarities, the toner adheres to the charged portions on the surface of photosensitive member 101. Developing device 104 and particularly sleeve 104a are positioned relative to photosensitive member 101 so that sleeve 104a which is at the lowest portion of developing device 104 is within a range of 10°–90° of the horizontal line. By conforming to this position, toner is most efficiently transported through sleeve [4a] *104a* by means of gravity.

While all of the above is taking place, the uppermost sheet of paper 108a stored in paper stacker 108 is being advanced through an opening 108b in casing 117 by paper feeder roller 109 until the uppermost sheet 108a comes into contact with register rollers 110. Sheet 108a will then remain in a standby position being blocked from further advancement by paper register roller 110 until sheet 108a is synchronized with the image formed on photosensitive member 101 following the latter's advancement past developing device 104. Upon being instructed by control board 116 to allow sheet 108 to continue its advancement along a predetermined path between register roller 110 and fixing device 111 (hereinafter referred to as "paper transport path 121"), register rollers 110 begin to rotate. Transfer device 105, which comprises a fine metal wire and a ground electrode similar in operation to charging device 102, will then charge the rear surface of sheet 108a with either positive or negative ions. The toner, which has been deposited on the surface of photosensitive member 101, is attracted/transferred to the obverse surface of sheet 108a in accordance with the polarity of the charge existing on the rear surface of sheet 108a.

The toner is permanently fixed to sheet 108a by fixing device 111. Fixing device 111 comprises rollers 111a and 111b. A heat source such as an infrared lamp (not shown) is positioned in the center of roller 111a so as to raise the temperature of the latter to between about 140° C. to 200° C. Upon sheet 108a advancing between rollers 111a and 111b and being heated by roller 111a, a resin contained in the toner penetrates and thereby fuses to the fibers of sheet 108a. As sheet 108a advances beyond fixing device 111, the fused toner rapidly cools and is thereby permanently fixed to the surface of sheet 108a. Other suitable techniques for fixing toner to paper such as, but not limited to, employing heat and pressure rollers also can be used.

Finally, sheet 108a with the image now fixed thereto is guided by plate 112 and advanced by delivery rollers 113 through an opening 120 of casing 117 onto delivery tray 118.

As photosensitive member 101 continues to rotate past transfer device 105, excess toner which has not been transferred onto sheet 108a is scraped off photosensitive member 101 by cleaning device 106. Thereafter, the entire surface of photosensitive member 101 is uniformly irradiated with light by erasing device 107 and thereby grounds any charge remaining on photosensitive member 101 as the latter passes beyond cleaning device 106. Accordingly, the entire surface of photosensitive member 101 is uncharged as it next approaches charging device 102. Exhaust fan 114 is disposed near and below fixing device 111 to carry away heat generated by power supply 115 and fixing device 111.

For minimizing curling and/or wrinkling of the recording medium as the same travels along path 121, register rollers 110 and fixing rollers 111a and 111b are positioned along path 121 such that less than an 80° angle is formed and preferably as close to a zero angular deviation exists in path 121 between these two pairs of rollers. Additionally, the angle formed by the plane of the paper as it travels from stacker 108 at opening 108b until it passes through opening 120, that is, the angle formed by the path of the paper between the opening for insertion into and discharge from apparatus should be 90° or less.

Based on the foregoing apparatus 100 will have a width W of approximately 300 millimeters, a depth D of approximately 170 millimeters and a height H of proximately 260 millimeters. The first print time based on a print speed of eight pages per minute is approximately twelve seconds compared to approximately thirty to forth seconds for prior art face-down delivery systems.

As shown in FIG. 3, optical system generator 103 employing a laser diode 119a requires the length of the optical path p to be no less than about 300 millimeters. It is, therefore, difficult to minimize depth D since a substantial portion of depth D is based on the length of optical path p. One approach in minimizing depth D when using laser diode 119a is shown in FIG. 4 wherein a reflector 119b and a polygon scanner 119c are used to bend the optical path p. The light generated by laser diode 119a forming the latent image is reflected by polygon scanner 119c which is rotated at a high speed toward reflector 119b (i.e., a mirror) which in turn directs the latent image towards photosensitive member 101.

Figure 5:
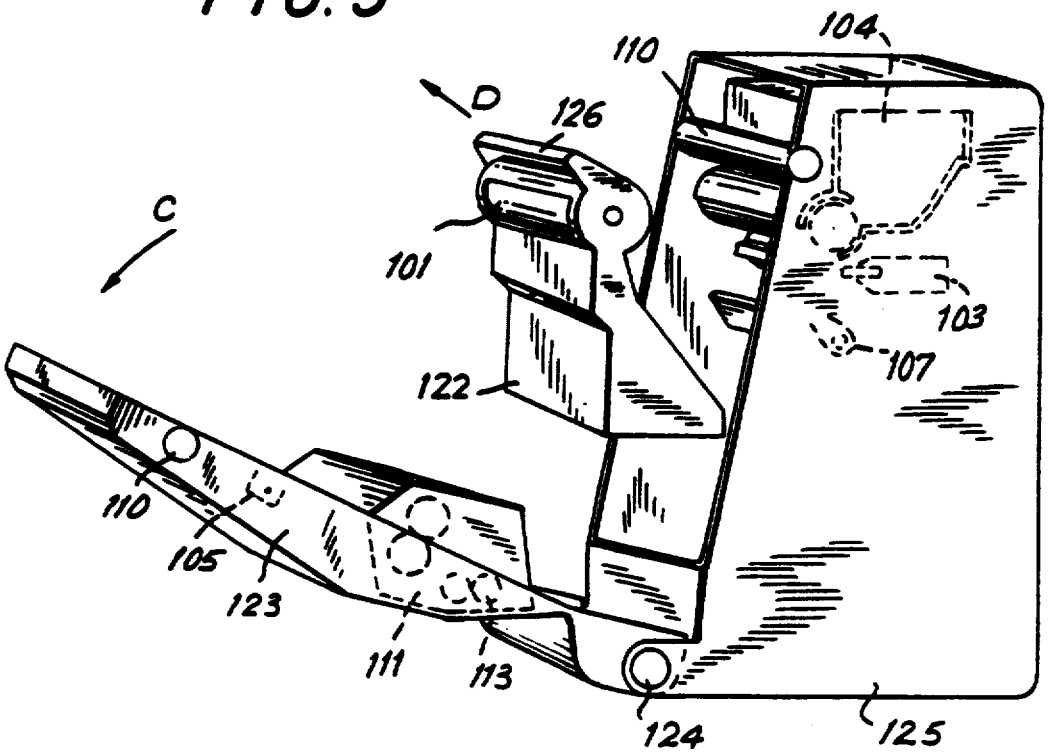
FIG. 5 is a partially exploded, diagrammatic perspective view of FIG. 1.

In order to provide easy access to apparatus 100 for purposes of maintenance and repair, a detachable cartridge 122, as shown in FIG. 5, is employed. Cartridge 122 comprises photosensitive member 101, charging device 102 and cleaning device 106; all of which form one integral unit. Cartridge 122 may be loaded or unloaded (in the direction of arrow D) from apparatus 100 by first opening (in the direction of arrow C) door 123 which is pivotably connected by a shaft 124 to the bottom of housing 125. Cartridge 122 is guided and supported by a guide member (not shown) which is rigidly secured to housing 125. *Door 123 provides access to the interior of apparatus 100 including paper transport path 121 and opens so that at least a portion of door 123 travels generally upwardly and downwardly in a plane which is in a direction substantially parallel to the direction of gravity.*

Figure 6A:
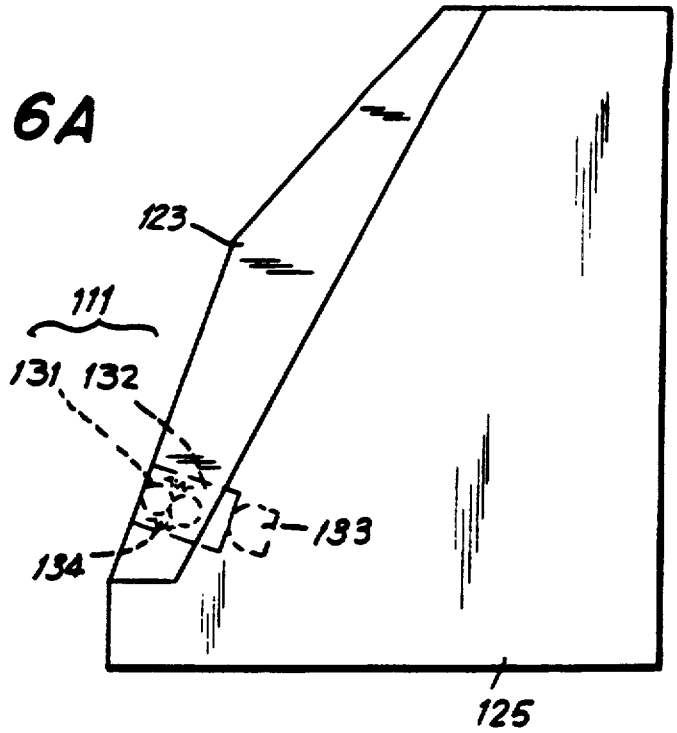
FIGS. 6A and 6B are diagrammatic side elevational views of FIG. 1.
Figure 6B:
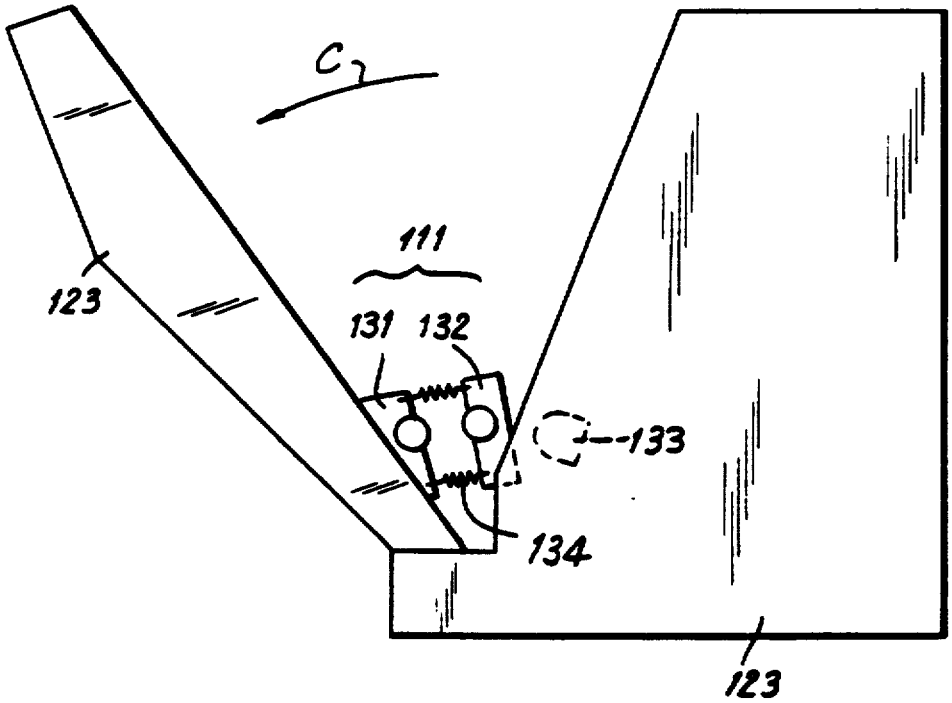

As shown in FIGS. 6A and 6B, fixing device 111 comprises two roller sections 131 and 132 with rollers 111a and 111b disposed in their respective section and [resiliant] *resilient* members such as springs 134 connected between the two sections. Roller 111b is made of a flexible material such as, but not limited to, soft gum while roller 111a is made of a hard substance such as, but not limited to, stainless steel. Therefore, when the two rollers are pressed together (commonly referred to as the "NIP pressure") an extensive surface area of contact between the two rollers exists. Springs 134 exert pressure against roller sections 131 and 132 in a direction to cancel the NIP pressure. Accordingly, when door 123 is opened, the NIP pressure is cancelled. When door 123 is closed, however, roller section 132 is pressed against an abutment 133 which is rigidly secured within housing 125 resulting in sufficient NIP pressure being applied to rollers 111a and 111b for fixing the toner onto the recording medium.

Figure 7A:
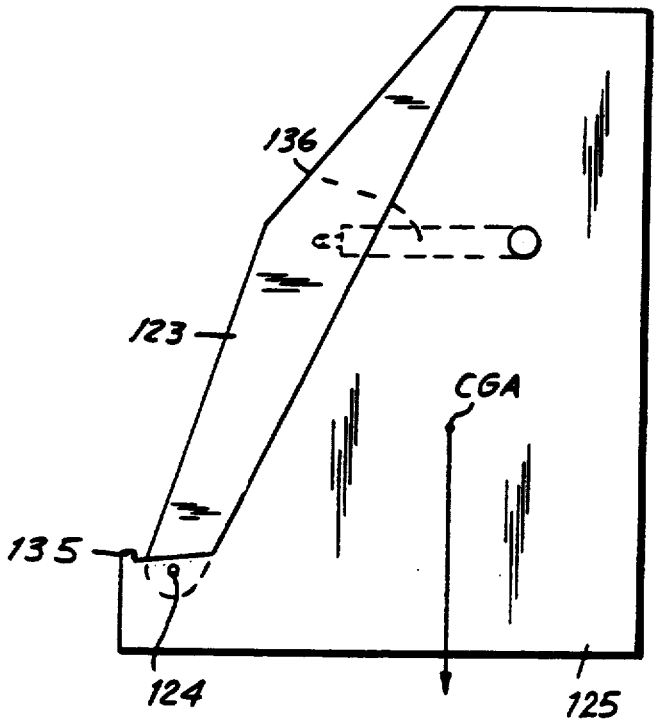
FIGS. 7A and 7B are diagrammatic side elevational views similar to FIGS. 6A and 6B, respectively, in accordance with an alternative embodiment of the present invention.
Figure 7B:
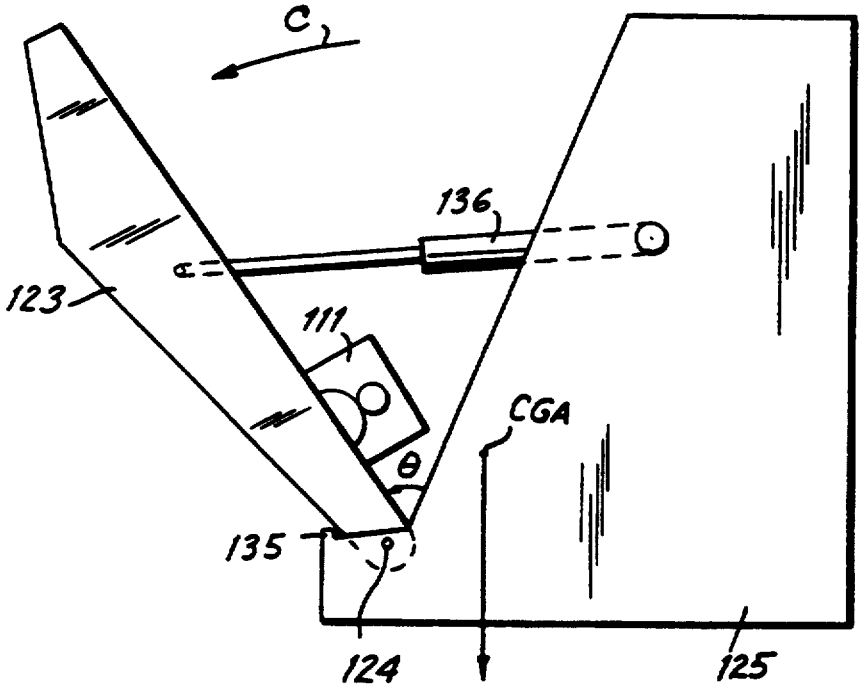

As shown in FIGS. 7A and 7B, as door 123 is opened in the direction of arrow C, the center of gravity of apparatus 100, as indicated by arrow CGA, shifts toward door 23. In order to avoid apparatus 100 from falling down in the direction of arrow C, an additional abutment 135, is provided. In particular, abutment 135 limits the angle to a value of $\theta$ beyond which the position of door 123 would cause the center of gravity CGA to be outside and below apparatus 100 and thus cause apparatus 100 to tip over.

As also shown in FIGS. 7A and 7B, fixing device 111 is connected to door 123. Since device 111 is relatively heavy, a damping means 136 is connected between door 123 and housing 125 so as to enable door 123 to be opened smoothly and slowly.

Figure 8:
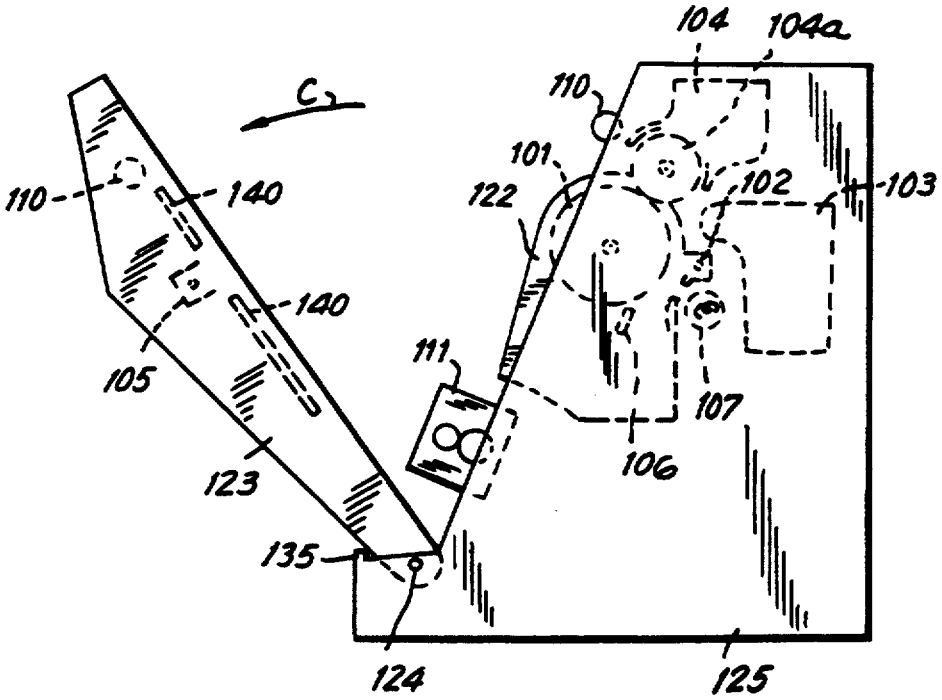
FIG. 8 is a diagrammatic side elevational view similar to FIG. 6B in accordance with another alternative embodiment of the present invention.
Figure 9A:
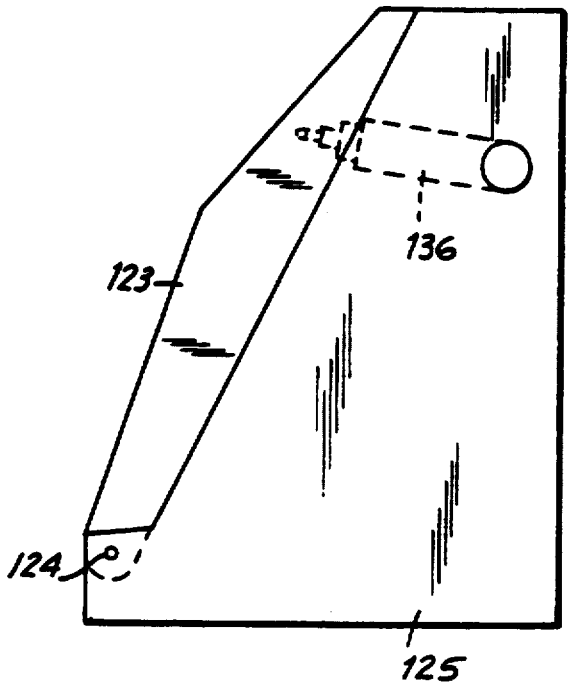
FIGS. 9A and 9B are diagrammatic side elevational views similar to FIGS. 7A and 7B, respectively, in accordance with a previous alternative embodiment of the present invention.
Figure 9B:
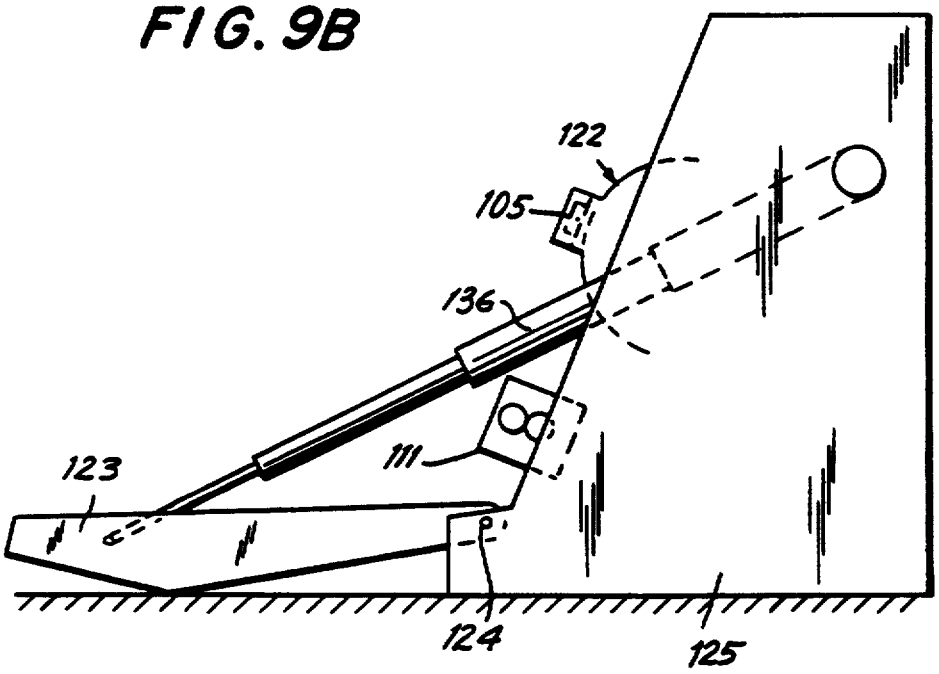

As shown in FIG. 8, fixing device 111 can be connected to housing 125 rather than door 123 in order to facilitate the removal of paper jams. Cartridge [22] *122* of course, should be positioned so that it can be loaded from or removed from apparatus 100 without obstructing fixing device 111. Additionally, in order to further control and maintain proper paper alignment, paper guides 140 are provided in door 123. Furthermore, with fixing device 111 connected to housing 125 rather than door 123 the center of gravity (CGA) of apparatus 100 remains within apparatus 100 even when door 123 is fully opened. Accordingly, as illustrated in FIGS. 9A and 9B, there is no need for abutment 135. Although there is also no need for damping means 136, in order to more easily and smoothly open and close door 123 damping means 136 may still be desired.

Referring now to FIGS. 10A–10E, variations in the connection of transfer device 105 to cartridge 122 are shown. FIG. 10A illustrates a side elevational view of cartridge 122 and transfer device 105 prior to (in dashed lines) and after connection to the front of cartridge 122 wherein transfer device 105 is frictionally fitted within an opening of cartridge 122. FIGS. 10B and 10C show top plan views of cartridge 122 and transfer device 105. Transfer device 105 is [rotatably] *rotated* in a direction of arrow F and pivotably attached to one side of cartridge 122. In order to place transfer device 105 in its operating position, a protrusion 105a of device 105 is connected to a latch 122a of cartridge 122. FIGS. 10D and 10E are side elevational views of cartridge 122 and transfer device 105. Transfer device 105 is pivotably connected at its top to cartridge 122, In FIG. 10D, cartridge 105 is shown pivoted in the direction of arrow G away from cartridge 122. FIG. 10E shows cartridge 105 in its normal operating position.

Figure 11:
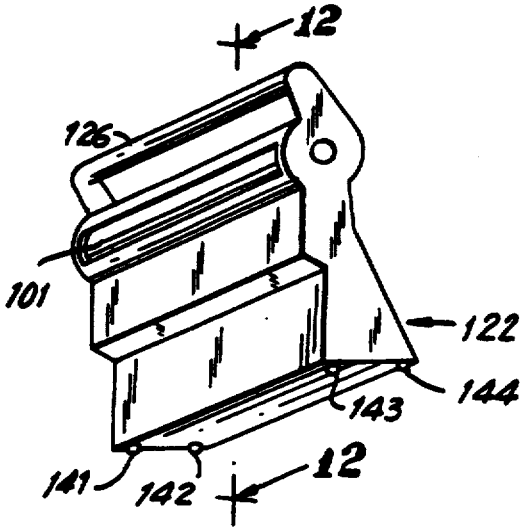
FIG. 11 is a perspective view of the cartridge shown in FIG. 5.

As previously mentioned, cartridge 122 includes cleaning device 106 which accumulates toner waste. It is therefore important that cartridge 122 as it is removed from and inserted into housing 125 not be tilted to prevent the toner from flowing out of cleaning device 106. In order to prevent such tilting, as shown in FIG. 11, the bottom surface of cartridge 122 should define a plane wherein the center of gravity of cleaning device 106 extends in a direction perpendicular to the plane. This can be accomplished using a flat bottom surface or at least three but typically four projections 141–144 provided on the bottom surface. Consequently, cartridge 122 will remain stable within apparatus 100 during operation of the latter. Employment of rubber leg members for projections 141–144 further improves stability and prevents generation of noise. The projections may also be used as positioning members for properly positioning cartridge 122 within housing 123.

Figure 12:
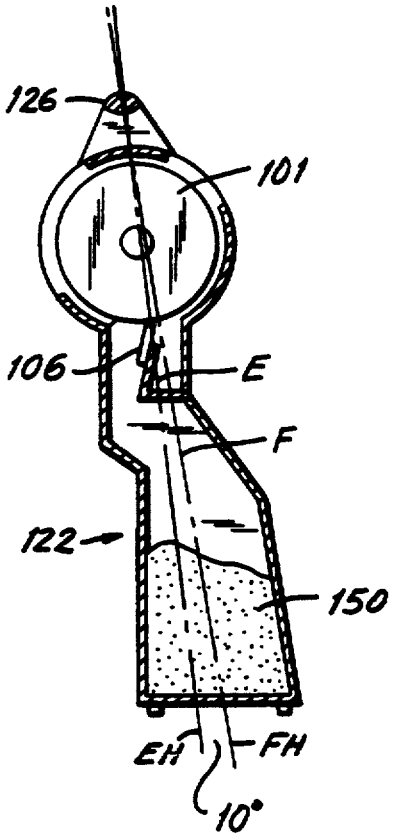
FIG. 12 is a sectional view of the cartridge taken along the lines 12—12 of FIG. 11.

Referring now to FIG. 12, to facilitate removal of cartridge 122 from housing 125 for insertion thereinto while maintaining the bottom of cartridge 122 level handle 126 of cartridge 122 should be tilted at one of a plurality of predetermined angles relative to this plane. In order to ensure that the tilt of handle 126 meets the foregoing requirements, an angle formed by lines EH and FH which extends between handle 126 (H) and the center of gravity prior to (E) and after (F) collection of toner within box 150 of cleaning device 106, respectively, should be about 10° or less.

In view of the foregoing, it now can be readily appreciated that apparatus 100 has a reduced bottom area which minimizes the space required to support the same and thus can be accommodated on the top of a desk. Additionally, since the paper transport path is substantially straight, envelopes and other recording medium having similar or greater thickness can be used in a face-down delivery system without becoming curled and/or wrinkled and thereby jamming the copter. Furthermore, since door 123 pivots about its bottom, access to apparatus 100 is significantly easter than prior art copiers. Accordingly, removal of cartridges and other components which require maintenance and/or repair does not require an operator to bend his body into a stooped or other uncomfortable position. Still further, access to all internal components of apparatus 100 can be had from the top of the latter. Additionally, the installation space required for apparatus 100 is significantly less than compared to prior art copiers employing face-down delivery systems.

As now can be also readily appreciated, the present invention significantly reduces the period of time to reproduce and deliver an image formed on a recording medium when employing a face-down delivery system due to the relatively short paper transport path.

It will thus be seem that the objects set forth above, and those made apparent from the preceding description, are efficiently obtained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. An apparatus for forming an image on a recording medium *which is delivered with the image face down*, comprising:

means for inserting into the apparatus the recording medium onto which the image is formed;

tray means for supporting the recording medium after the image has been formed on the recording medium;

means for discharging the recording medium into said tray means with the image formed on the recording medium facing the tray means; [and]

a path for transporting the recording medium from the means for inserting to the tray means *with the image face down;*

*door means for providing access to the interior of the apparatus including the path, the door means including a door which opens so that at least a portion of the door travels generally upwardly and downwardly in a plane which is in a direction substantially parallel to the direction of gravity; and*

*support means for supporting the apparatus and positioned below the path;* wherein the path for transporting the recording medium forms an angle of 90° or less between the *plane of the path at the* means for inserting and the *plane of the path at the* tray means.

2. The apparatus as in claim 1, further including first rollers for advancing said recording medium along said path and second rollers for fixing the image on said recording medium; said first rollers and second rollers disposed within said apparatus such that substantially zero angular deviation exists in the path between said first rollers and said second rollers.

3. The apparatus as in claim 2, further including a photosensitive member having a central axis and an optical signal generator; said generator producing an optical signal which strikes said photosensitive member within a 60° range centered about a line which extends through said central axis and which is normal to said path for transporting the recording medium.

4. The apparatus as in claim 3, further including a developing device containing toner and which includes sleeve means for transporting the toner to said photosensitive member; said sleeve means located between 10° to 90° from said line.

5. The apparatus as in claim 4, wherein said developing device is positioned above said optical signal generator.

6. [The apparatus of claim 1, further including] *An apparatus for forming an image on a recording medium which is delivered with the image face down, comprising:*

*means for inserting into the apparatus the recording medium onto which the image is formed;*

*tray means for supporting the recording medium after the image has been formed on the recording medium;*

*means for discharging the recording medium into said tray means with the image formed on the recording medium facing the tray means;*

*a path for transporting the recording medium from the means for inserting to the tray means; and* a housing having an interior and a door *which opens so that at least a portion of the door travels generally upwardly and downwardly in a plane which is in a direction substantially parallel to the direction of gravity* for preventing or permitting entry into the interior of said housing; and wherein upon closing the door said path runs between the door and housing;

*wherein the path for transporting the recording medium forms an angle of 90° or less between the plane of the path at the means for inserting and the plane of the path at the tray means.*

7. The apparatus as in claim 6, wherein said means for inserting is located near the top of said housing and said means for discharging is located at the bottom of said door.

8. The apparatus as in claim 6, further including a photosensitive member, an optical signal generator, a developing device, a transfer device, a cleaning device and a charging device operatively mounted within said housing.

9. The apparatus as in claim 6, further including a photosensitive member, an optical signal generator, a developing device, a cleaning device and a charging device disposed within said housing and a transfer device operatively mounted to the interior side of said door.

10. The apparatus as in claim 6, further including a photosensitive member having a central axis and wherein said door is pivotally mounted about an axis located at the bottom thereof and which is parallel to said central axis.

11. The apparatus as in claim 6, further including a fixing device for fixing the image on said recording medium and is disposed within said housing.

12. The apparatus as in claim 6, further including a fixing device mounted on said door for fixing the image on said recording medium.

13. The apparatus as in claim 6, further including a fixing device for fixing the image on said recording medium, said fixing device comprising a pair of rollers whose NIP pressure is cancelled when said door is open.

14. The apparatus as in claim 6, further including a detachable cartridge which can be removed from and attached to the interior of said housing; said cartridge comprising a photosensitive member, a charging device and a cleaning device.

15. The apparatus as in claim 14, wherein said cartridge further includes a transfer device.

16. The apparatus as in claim 15, wherein said transfer device is pivotally connected to said cartridge.

17. The apparatus as in claim 15, wherein said transfer device is detachable from said cartridge.

18. The apparatus as in claim 14, further including a developing device which contains toner and wherein said cleaning device is operable for collecting toner waste.

19. The apparatus as in claim 18, wherein said cleaning device includes either a flat bottom surface or at least three projections which define a plane wherein the center of gravity of said cleaning device is perpendicular to said flat bottom surface or said plane.

20. The apparatus as in claim 19, wherein said cartridge further comprises a handle which is tilted at one of a plurality of predetermined angles relative to said flat bottom surface or plane and which facilitates removal of said cartridge from said housing or insertion thereinto while maintaining said flat bottom surface or plane level.

21. The apparatus as in claim 20, wherein the tilt of said handle is based on an angle of not greater than approximately 10° formed by lines drawn between said handle and the center of gravity prior to and after collection of said toner by said cleaning device.

22. The apparatus as in claim 6, further comprising a stacking tray for storing said recording medium prior to being received by said means for inserting and a delivery tray for receiving said recording medium from said means for discharging.

23. The apparatus as in claim 22, wherein said delivery tray is pivotably connected to said apparatus whereby the distal end of said delivery tray can be rotated toward said apparatus.

24. The apparatus as in claim 22, wherein said stacking tray and said delivery tray are positioned relative to said path and to each other such that the plane of said recording medium at any position relative to any other position it assumes beginning with said stacking tray and ending with said delivery tray does not exceed 90°.

25. A method of forming an image on a recording medium comprising the steps of:

inserting the recording medium into a first opening of an apparatus *having a housing with a door to provide access to the interior of the housing with the door opening so that at least a portion of the door travels generally upwardly and downwardly in a plane which is in a direction substantially parallel to the direction of gravity;* discharging the recording medium from a second opening of the apparatus into a tray with the image formed on the recording medium facing the tray; and feeding the recording medium along a path [which] *so that the plane of the path* forms an angle of 90° or less [from] *between the plane of the path at* the first opening [to] *and the plane of the path at* the tray.

26. The method as in claim 25, further including the step of feeding the recording medium along a path having substantially zero angular deviation between first rollers which advance said recording medium and second rollers which fix the image on said recording medium.

27. The method as in claim 26, further including the step of producing from an optical signal generator an optical signal which strikes a photosensitive member of the apparatus within a 60° range centered about a line which extends through a central axis of the photosensitive member and which is normal to said path for transporting the recording medium.

28. An apparatus for forming an image on a recording medium comprising:

*door means for providing access to the interior of the apparatus, the door means including a door which opens so that at least a portion of the door travels generally upwardly and downwardly in a plane which is in a direction substantially parallel to the direction of gravity;* means for inserting into the apparatus the recording medium onto which the image is formed;

tray means for supporting the recording medium after the image has been formed on the recording medium;

means for discharging the recording medium into the tray means with the image formed on the recording medium facing the tray means;

a path for transporting the recording medium from the means for inserting to the tray means *and* which forms an angle of 90° or less between the *plane of the path at the* means for inserting and the *plane of the path at the* tray means;

first rollers for advancing said recording medium; [and]

second rollers for fixing the image on said recording medium; *and*

*support means for supporting the apparatus and positioned below the path;* wherein said first rollers and second rollers are disposed within said apparatus such that an angular deviation of less than 80° exists [in] *between* the *plane of the* path [betWeen] *through* said first rollers and *the plane of the path through* said second rollers.

29. The apparatus as in claim 28, wherein said first rollers and said second rollers are disposed within said apparatus such that substantially zero angular deviation exists in the path between said first rollers and said second rollers.

30. The apparatus as in claim 29, further including a photosensitive member having a central axis and an optical signal generator; said generator producing an optical signal which strikes said photosensitive member within a 60° range centered about a line which extends through said central axis and which is normal to said path for transporting the recording medium; a developing device containing toner and which includes sleeve means for transporting the toner to said photosensitive member wherein said sleeve means are located between 10°–90° above said line; a housing having an interior and a door for preventing or permitting entry into the interior of said housing wherein upon closing the door said path runs between the door and housing and wherein said means for inserting is located at the top of said housing and said means for discharging is located at the bottom of said door; and a detachable cartridge which can be removed from and attached to the interior of said housing and which comprises said photosensitive member, a charging device and a cleaning device.

*31. An apparatus for producing a recording medium with an image formed thereon delivered with the image face down, comprising:*

*means for forming the image on the recording medium;*

*transport means for transporting the recording medium through the apparatus after the image has been formed on the recording medium;*

*discharge means for discharging the recording medium with the image formed thereon into tray means;*

*said tray means for receiving and supporting the discharged recording medium with the image formed on the recording medium facing the tray means;*

*a path for advancing the recording medium from the means for forming an image on the recording medium to the tray means; and*

*door means for providing access to the interior of the apparatus including the path, the door means including a door which opens so that at least a portion of the door travels generally upwardly and downwardly in a plane which is in a direction substantially parallel to the direction of gravity;*

*wherein the path forms an angle of 90° or less between the intersection of the plane of the path at the means for forming an image with the plane of the path at the tray means.*

*32. The apparatus as in claim 31, further including a photosensitive member having a central axis and an optical signal generator; said generator producing an optical signal which strikes said photosensitive member within a 60° range centered about a line which extends through said central axis and which is substantially normal to at least a portion of said path.*

*33. The apparatus as in claim 32, further including a developing device containing toner and which includes sleeve means for transporting the toner to said photosensi-*

*tive member; said sleeve means located between 10° to 90° from said line.*

*34. A method of producing a recording medium with an image formed thereon delivered with image face down comprising the steps of:*

*forming the image on the recording medium within an apparatus having door means for providing access to the interior of the apparatus including a path for transporting the recording medium, the door means having a door which opens so that at least a portion of the door travels generally upwardly and downwardly in a plane which is in a direction substantially parallel to the direction of gravity;*

*discharging the recording medium from an opening in the apparatus into a tray with the image formed on the recording medium facing the tray; and*

*advancing the recording medium along said path is 90° or less between the intersection of the plane of the path where the image is formed on the recording medium with the plane of the path at the tray.*

*35. The method as in claim 34, further including the step of producing from an optical signal generator an optical signal which strikes a photosensitive member of the apparatus within a 60° range centered about a line which extends through a central axis of the photosensitive member and which is normal to at least a portion of said path.*

*36. An apparatus for forming an image on a recording medium which is delivered with the image face down, comprising:*

*transfer means for transferring the image onto the recording medium;*

*fixing means for fixing the image on the recording medium;*

*tray means for receiving the recording medium with the image face down after the image has been formed thereon;*

*path means for transporting the recording medium within the apparatus and for delivery to the tray means with the image face down wherein the transfer means and fixing means are disposed within the apparatus so that the direction of the path between the transfer means and fixing means is substantially parallel to the direction of gravity;*

*door means for providing access to the interior of the apparatus including the path, the door means including a door which opens so that at least a portion of the door travels generally upwardly and downwardly in a plane which is in a direction substantially parallel to the direction of gravity; and*

*support means positioned below said path for supporting said apparatus.*

*37. An apparatus for forming an image as in claim 36, further comprising:*

*recording medium input means for inputting recording medium, wherein said door is located on the same side of the apparatus as for gaining access to the input means.*

*38. A method for producing a recording medium with an image formed thereon by an apparatus, comprising the steps of:*

*forming the image on the recording medium;*

*permanently fixing the image formed on the recording medium;*

*discharging the recording medium with the image formed thereon face down;*

*transporting the recording medium along a path between the locations at which the image is formed and permanently fixed on the recording medium; and*

*supporting the apparatus below the path, said apparatus including door means for providing access to the interior of the apparatus including the path, the door means including a door which opens so that at least a portion of the door travels generally upwardly and downwardly in a plane which is in a direction substantially parallel to the direction of gravity;*

*wherein the path is substantially parallel to the direction of gravity.*

*39. An apparatus for forming an image on a recording medium, comprising:*

*transfer means for initially forming an image on the recording medium;*

*fixing means for permanently forming an image on the recording medium;*

*a path for transporting the recording medium within the apparatus wherein the transfer means and fixing means are disposed within the apparatus so that the direction of the path between the transfer means and fixing means is substantially parallel to the direction of gravity;*

*a photosensitive member;*

*a charging device for charging the photosensitive member;*

*an optical signal generator operable for producing an optical signal for striking the charged photosensitive member;*

*a developing device for supplying toner to said charged photosensitive member following said optical signal striking the charged photosensitive member;*

*a cleaning device operable for cleaning the toner disposed on the photosensitive member after initial formation of the image on the recording medium;*

*discharge means for discharging the recording medium with the formed image facing downwardly; and*

*the apparatus formed with a door for providing access to the interior of the apparatus, the door opening so that at least a portion of the door travels generally upwardly and downwardly in a plane which is in a direction substantially parallel to the direction of gravity;*

*wherein said charging device, optical signal generator, developing device, transfer means and cleaning device are disposed around the photosensitive member and the transfer means is disposed on one side of the photosensitive member such that the initial formation of the image on the recording medium occurs after the recording medium advances between said photosensitive member and said transfer means.*

*40. An apparatus for forming an image on a recording medium, comprising:*

*transfer means for initially forming an image on the recording medium;*

*fixing means for permanently forming an image on the recording medium;*

*a path for transporting the recording medium within the apparatus wherein the transfer means and fixing means are disposed within the apparatus so that the direction of the path between the transfer means and fixing means is substantially parallel to the direction of gravity;*

*a photosensitive member;*

*a charging device for charging the photosensitive member;*

*an optical signal generator operable for producing an optical signal for striking the charged photosensitive member;*

*a developing device for supplying toner to said charged photosensitive member following said optical signal striking the charged photosensitive member;*

*a cleaning device operable for cleaning the toner disposed on the photosensitive member after initial formation of the image on the recording medium;*

*discharge means for discharging the recording medium with the formed image facing downwardly; and*

*the apparatus formed in a door for providing access to the interior of the apparatus, the door opening so that at least a portion of the door travels generally upwardly and downwardly in a plane which is in a direction substantially parallel to the direction of gravity;*

*wherein said charging device, optical signal generator, developing device, transfer means and cleaning device are disposed around the photosensitive member; the transfer means is disposed on one side of the photosensitive member such that the initial formation of the image on the recording medium occurs after the recording medium advances between said photosensitive member and said transfer means; the optical signal generator is disposed facing the rear side of the photosensitive member; the transfer means is disposed facing the front side of the photosensitive member; the charging device and cleaning device are disposed facing the bottom of the photosensitive member and the developing device is disposed facing the top of the photosensitive member.*

*41. An apparatus for forming an image on a recording medium, comprising:*

*transfer means for initially forming an image on the recording medium;*

*fixing means for permanently forming an image on the recording medium;*

*a path for transporting the recording medium within the apparatus wherein the transfer means and fixing means are disposed within the apparatus so that the direction of the path between the transfer means and fixing means is substantially parallel to the direction of gravity;*

*a photosensitive member;*

*a charging device for charging the photosensitive member;*

*an optical signal generator operable for producing an optical signal for striking the charged photosensitive member;*

*a developing device for supplying toner to said charged photosensitive member following said optical signal striking the charged photosensitive member;*

*a cleaning device operable for cleaning the toner disposed on the photosensitive member after initial formation of the image on the recording medium;*

*discharge means for discharging the recording medium with the formed image facing downwardly;*

*the apparatus adapted to receive a cartridge containing at least two of the photosensitive member, cleaning device and charging device; and*

*the apparatus formed with a door for providing access to the interior of the apparatus, the door opening so that at least a portion of the door travels generally upwardly and downwardly in a plane which is in a direction substantially parallel to the direction of gravity;*

*wherein said charging device, optical signal generator, developing device, transfer means and cleaning device are disposed around the photosensitive member and wherein the transfer means is disposed on one side of the photosensitive member such that the initial formation of the image on the recording medium occurs after the recording medium advances between said photosensitive member and said transfer means.*

*42. An apparatus for forming an image on a recording medium which is delivered with the image face down, comprising:*

*a photosensitive member;*

*a charging device for charging the photosensitive member;*

*a generator operable for producing an optical signal for striking the charged photosensitive member, said signal representative of the image;*

*a developing device for supplying toner to said charged photosensitive member following said optical signal striking the photosensitive member, said toner being deposited on the photosensitive member based on the charging of the photosensitive member;*

*a transfer device for transferring toner deposited on the photosensitive member to the recording medium whereby the image is formed on the recording medium;*

*delivery means for discharging the recording medium with the image formed thereon facing in a downwardly direction;*

*a path for transporting the recording medium from the transfer device through discharge by the delivery means;*

*support means positioned below said path for supporting said apparatus; and*

*door means for providing access to the interior of the apparatus including the path, the door means including a door which opens so that at least a portion of the door travels in a plane generally upwardly and downwardly which is in a direction substantially parallel to the direction of gravity;*

*wherein the transfer device and photosensitive member each have a bottom portion, the bottom portion of the transfer device positioned above the bottom portion of the photosensitive member and wherein the intersection of the plane of the path at the transfer device with the plane of the path at the delivery means forms an angle of less than 90°.*

*43. The apparatus as in claim 42, wherein the photosensitive member has a central axis and the optical signal strikes the photosensitive member within a 60° range centered about a line which extends through said central axis and which is substantially normal to that portion of the path near the transfer device.*

*44. The apparatus as in claim 43, wherein the developing device includes a sleeve means for transporting the toner to said photosensitive member; said sleeve means located between 10° to 90° from said line.*

*45. The apparatus as in claim 44, wherein said developing device is positioned above said generator.*

*46. An apparatus for forming an image on a recording medium which is delivered with the image face down, comprising:*

*a photosensitive member;*

*a charging device for charging the photosensitive member;*

*a generator operable for producing an optical signal for striking the charged photosensitive member, said signal representative of the image;*

*a developing device for supplying toner to said charged photosensitive member following said optical signal striking the photosensitive member, said toner being deposited on the photosensitive member based on the charging of the photosensitive member;*

*a transfer device for transferring toner deposited on the photosensitive member to the recording medium whereby the image is formed on the recording medium;*

*delivery means for discharging the recording medium with the image formed thereon facing in a downwardly direction;*

*a path for transporting the recording medium from the transfer device through discharge by the delivery means;*

*support means positioned below said path for supporting said apparatus;*

*door means for providing access to the interior of the apparatus including the path, the door means including a door which opens so that at least a portion of the door travels generally upwardly and downwardly in a plane which is in a direction substantially parallel to the direction of gravity;*

*a cleaning device operable for removing toner remaining on the photosensitive member following transfer of toner to the recording medium; and*

*a cartridge containing at least two of the photosensitive member, the charging device and the cleaning device;*

*wherein the transfer device and photosensitive member each have a bottom portion, the bottom portion of the transfer device positioned above the bottom portion of the photosensitive member and wherein the intersection of the plane of the path at the transfer device with the plane of the path at the delivery means forms an angle of less than 90°.*

*47. The apparatus as in claim 46, wherein the photosensitive member has a central axis and the optical signal strikes the photosensitive member within a 60° range centered about a line which extends through said central axis and which is substantially normal to that portion of the path near the transfer device.*

*48. The apparatus as in claim 47, wherein the developing device includes a sleeve means for transporting the toner to said photosensitive member; said sleeve means located between 10° to 90° from said line.*

*49. The apparatus as in claim 48 wherein said developing device is positioned above said generator.*

*50. An apparatus for forming an image on a recording medium which is delivered with the image face down, comprising:*

*a photosensitive member;*

*insertion means for insertion of the recording medium into the apparatus and disposed above the photosensitive member;*

*a charging device for charging the photosensitive member;*

*a generator operable for producing an optical signal for striking the charged photosensitive member, said signal representative of the image;*

*a developing device for supplying toner to said charged photosensitive member following said optical signal striking the photosensitive member, said toner being deposited on the photosensitive member based on the charging of the photosensitive member;*

*a transfer device for transferring the toner deposited on the photosensitive member to the recording medium whereby the image is formed on the recording medium;*

*delivery means for discharging the recording medium with the image formed thereon facing in a downwardly direction and disposed below the photosensitive member;*

*a path for transporting the recording medium from the transfer device through discharge by the delivery means;*

*support means positioned below said path for supporting said apparatus;*

*door means for providing access to the interior of the apparatus including the path, the door means including a door which opens so that at least a portion of the door travels generally upwardly and downwardly in a plane which is in a direction substantially parallel to the direction of gravity;*

*a cleaning device operable for removing toner remaining on the photosensitive member following transfer of toner to the recording medium; and*

*tray means for receiving and supporting the discharged recording medium from the delivery means;*

*wherein the transfer device and photosensitive member each have a bottom portion, the bottom portion of the transfer device positioned above the bottom portion of the photosensitive member and wherein the intersection of the plane of the path at the transfer device with the plane of the path at the delivery means forms an angle of less than 90°.*

*51. The apparatus as in claim 50, wherein the photosensitive member has a central axis and the optical signal strikes the photosensitive member within a 60° range centered about a line which extends through said central axis and which is substantially normal to that portion of the path near the transfer device.*

*52. The apparatus as in claim 51, wherein the developing device includes sleeve means for transporting the toner to said photosensitive member; said sleeve means located between 10° to 90° from said line.*

*53. The apparatus as in claim 52, wherein said developing device is positioned above said generator.*

*54. The apparatus of claim 50, wherein the tray means is disposed below the photosensitive member.*

*55. An apparatus for forming an image on a recording medium which is delivered with the image face down, comprising:*

*a photosensitive member;*

*a charging device for charging the photosensitive member;*

*an optical signal generator operable for producing an optical signal for striking the charged photosensitive member, said signal representing the image;*

*a developing device for supplying toner to the charged photosensitive member following the optical signal striking the charged photosensitive member, the toner being deposited on the photosensitive member based on the charging of the photosensitive member;*

*a transfer device for transferring toner deposited on the photosensitive member to the recording medium whereby the image is formed on the recording medium;*

*a cleaning device for cleaning toner disposed on the photosensitive member after formation of the image on the recording medium;*

*fixing means for permanently forming the image on the recording medium;*

*tray means for receiving the recording medium with the image face down after the image has been formed thereon;*

*path means for transporting the recording medium within the apparatus and for delivery to the tray means with the image face down which includes advancing the recording medium between the transfer device and photosensitive member wherein the trans-*

*fer device and fixing means are disposed within the apparatus so that the direction of the path means between the transfer device and fixing means is substantially parallel to the direction of gravity; and*

*a housing which includes a movable portion and a stationary portion, said movable portion being displaceable so that at least a portion thereof travels generally upwardly and downwardly in a plane which is in a direction substantially parallel to the direction of gravity, wherein said path means extends between said movable portion and said stationary portion and wherein said photosensitive member, optical signal generator, developing device, cleaning device and charging device are disposed within said stationary portion.*

*56. An apparatus for forming an image on a recording medium which is delivered with the image face down, comprising:*

*a photosensitive member;*

*a charging device for charging the photosensitive member;*

*an optical signal generator operable for producing an optical signal for striking the charged photosensitive member, said signal representing the image;*

*a developing device for supplying toner to the charged photosensitive member following the optical signal striking the charged photosensitive member, the toner being deposited on the photosensitive member based on the charging of the photosensitive member;*

*a transfer device for transferring toner deposited on the photosensitive member to the recording medium whereby the image is formed on the recording medium face down;*

*a cleaning device for cleaning toner disposed on the photosensitive member after formation of the image on the recording medium;*

*fixing means for permanently forming the image on the recording medium;*

*tray means for receiving the recording medium with the image face down after the image has been formed, thereon;*

*path means for transporting the recording medium within the apparatus which includes advancing the recording medium between the transfer device and photosensitive member and for delivery to the tray means with the image face down wherein the transfer device and fixing means are disposed within the apparatus so that the direction of the path means between the transfer device and fixing means is substantially parallel to the direction of gravity; and*

*a housing which includes a movable portion and a stationary portion, said movable portion being displaceable so that at least a portion thereof travels generally upwardly and downwardly in a plane which is in a direction substantially parallel to the direction of gravity, said path extending between said movable portion and said stationary portion and wherein the transfer device is mounted to said movable portion.*

*57. An apparatus for forming an image on a recording medium which is delivered with the image face down, comprising:*

*a photosensitive member;*

*a charging device for charging the photosensitive member;*

*an optical signal generator operable for producing an optical signal for striking the charged photosensitive member, said signal representing the image;*

*a developing device for supplying toner to the charged photosensitive member following the optical signal striking the charged photosensitive member, the toner being deposited on the photosensitive member based on the charging of the photosensitive member;* a transfer device for transferring toner deposited on the photosensitive member to the recording medium whereby the image is formed on the recording medium face down;

*a cleaning device for cleaning toner disposed on the photosensitive member after formation of the image on the recording medium;*

*fixing means for permanently forming the image on the recording medium face down;*

*tray means for receiving the recording medium with the image face down after the image has been formed thereon;*

*path means for transporting the recording medium within the apparatus which includes advancing the recording medium between the transfer device and photosensitive member and for delivery to the tray means with the image face down wherein the transfer device and fixing means are disposed within the apparatus so that the direction of the path means between the transfer device and fixing means is substantially parallel to the direction of gravity; and*

*a housing which includes a movable portion and a stationary portion, said movable portion being displaceable so that at least a portion thereof travels generally upwardly and downwardly in a plane which is in a direction substantially parallel to the direction of gravity, said path means extending between said movable portion and said stationary portion and wherein the fixing means is mounted to said movable portion.*

*58. An apparatus for forming an image on a recording medium which is delivered with the image face down, comprising:*

*a photosensitive member;*

*a charging device for charging the photosensitive member;*

*an optical signal generator operable for producing an optical signal for striking the charged photosensitive member, said signal representing the image;*

*a developing device for supplying toner to the charged photosensitive member following the optical signal striking the charged photosensitive member, the toner being deposited on the photosensitive member based on the charging of the photosensitive member;*

*a transfer device for transferring toner deposited on the photosensitive member to the recording medium whereby the image is formed on the recording medium;*

*a cleaning device for cleaning toner disposed on the photosensitive member after formation of the image on the recording medium;*

*fixing means for permanently forming the image on the recording medium;*

*tray means for receiving the recording medium with the image face down after the image has been formed thereon;*

*path means for transporting the recording medium within the apparatus which includes advancing the recording medium between the transfer device and photosensitive member and for delivery to the tray means with the image face down;*

*the path means for advancing the recording medium in a direction between the transfer device and fixing*

*means which is substantially parallel to the direction of gravity; and*

*a housing which includes a movable portion and a stationary portion, said movable portion being displaceable so that at least a portion thereof travels generally upwardly and downwardly in a plane which is in a direction substantially parallel to the direction of gravity, said path means extending between said movable portion and said stationary portion and wherein the fixing means is mounted to said stationary portion.*

*59. The apparatus of claim 58, wherein the transfer device and photosensitive member each has a bottom portion, the bottom portion of the transfer device positioned above the bottom portion of the photosensitive member.*

*60. An apparatus for forming an image on a recording medium which is delivered with the image face down, comprising:*

*a photosensitive member;*

*a charging device for charging the photosensitive member;*

*an optical signal generator operable for producing an optical signal for striking the charged photosensitive member, said signal representing the image;*

*a developing device for supplying toner to the charged photosensitive member following the optical signal striking the charged photosensitive member, the toner being deposited on the photosensitive member based on the charging of the photosensitive member face down;*

*a transfer device for transferring toner deposited on the photosensitive member to the recording medium whereby the image is formed on the recording medium face down;*

*a cleaning device for cleaning toner disposed on the photosensitive member after formation of the image on the recording medium;*

*fixing means for permanently forming the image on the recording medium;*

*tray means for receiving the recording medium with the image face down after the image has been formed thereon;*

*path means for transporting the recording medium within the apparatus which includes advancing the recording medium between the transfer device and photosensitive member and for delivery to the tray means with the image face down wherein the transfer device and fixing means are disposed within the apparatus so that the direction of the path means between the transfer device and fixing means is substantially parallel to the direction of gravity; and*

*a housing which includes a movable portion and a stationary portion, said path means extending between said movable portion and aid stationary portion, the movable portion being displaceable so that at least a portion thereof travels generally upwardly and downwardly in a plane which is in a direction substantially parallel to the direction of gravity; and*

*a damper mechanism for preventing the movable portion from falling downwardly at a rapid rate as the movable portion is separated from the stationary portion.*

*61. An apparatus for forming an image on a recording medium which is delivered with the image face down, comprising:*

*a photosensitive member;*

*a charging device for charging the photosensitive member;*

*an optical signal generator operable for producing an optical signal for striking the charged photosensitive member, said signal representing the image;*

*a developing device for supplying toner to the charged photosensitive member following the optical signal striking the charged photosensitive member, the toner being deposited on the photosensitive member based on the charging of the photosensitive member;*

*a transfer device for transferring toner deposited on the photosensitive member to the recording medium whereby the image is formed on the recording medium;*

*a cleaning device for cleaning toner disposed on the photosensitive member after formation of the image on the recording medium;*

*fixing means for permanently forming the image on the recording medium;*

*tray means for receiving the recording medium with the image face down after the image has been formed thereon;*

*path means for transporting the recording medium within the apparatus which includes advancing the recording medium between the transfer device and photosensitive member and for delivery to the tray means with the image face down wherein the transfer device and fixing means are disposed within the apparatus so that the direction of the path means between the transfer device and fixing means is substantially parallel to the direction of gravity;*

*a housing which includes a movable portion and a stationary portion, said movable portion being displaceable so that at least a portion thereof travels generally upwardly and downwardly in a plane which is in a direction substantially parallel to the direction of gravity, said path means extending between said movable portion and said stationary portion; and*

*cartridge means for storing at least two of the photosensitive member, the cleaning device and the charging device.*

*62. An apparatus for forming an image on a recording medium which is delivered with the image face down, comprising:*

*a photosensitive member;*

*a charging device for charging the photosensitive member;*

*an optical signal generator for producing an optical signal for striking the charged photosensitive member, said signal representing the image;*

*a developing device for supplying toner to the charged photosensitive member following the optical signal striking the charged photosensitive member, the toner being deposited on the photosensitive member based on the charging of the photosensitive member;*

*a transfer device for transferring toner deposited on the photosensitive member to the recording medium whereby the image is formed on the recording medium;*

*a cleaning device for cleaning toner disposed on the photosensitive member after formation of the image on the recording medium;*

*fixing means for permanently forming the image on the recording medium;*

*tray means for receiving the recording medium with the image face down after the image has been formed thereon;*

*path means for transporting the recording medium within the apparatus which includes advancing the recording medium between the transfer device and*

*photosensitive member and for delivery to the tray means with the image face down wherein the transfer device and fixing means are disposed within the apparatus so that the direction of the path means between the transfer device and fixing means is substantially parallel to the direction of gravity;*

*a housing which includes a movable portion and a stationary portion, said movable portion being displaceable so that at least a portion thereof travels generally upwardly and downwardly in a plane which is in a direction substantially parallel to the direction of gravity, said path means extending between said movable portion and said stationary portion; and*

*cartridge means for storing at least two of the photosensitive member, the cleaning device and the charging device;*

*wherein the cartridge means is disposed in the stationary portion of the housing.*

*63. An apparatus for forming an image on a recording medium which is delivered with the image face down, comprising:*

*a photosensitive member;*

*a charging device for charging the photosensitive member;*

*an optical signal generator operable for producing an optical signal for striking the charged photosensitive member;*

*a developing device for supplying toner to the charged photosensitive member following the optical signal striking the charged photosensitive member;*

*a transfer device for transferring the image onto the recording medium;*

*a fixing device for fixing the image on the recording medium;*

*tray means for receiving the recording medium with the image face down after the image has been formed thereon;*

*path means for delivering the recording medium to the tray means with the image face down wherein the transfer device and fixing device are disposed within the apparatus so that the direction of the path means between the transfer device and fixing device is substantially parallel to the direction of gravity;*

*a cleaning device for cleaning toner disposed on the photosensitive member after initial formation of the image on the recording medium; and*

*a housing which includes a movable portion and a stationary portion, said photosensitive member, optical signal generator, developing device, cleaning device and charging device mounted within said stationary portion and wherein said movable portion includes pivot means for pivoting said movable portion thereof in generally downwardly and upwardly directions with a portion thereof moving in a plane which is in a direction substantially parallel to the direction of gravity.*

*64. The apparatus as in claim 55, wherein the photosensitive member has a central axis and the signal generator strikes said photosensitive member within a 60° range centered about a line which extends through said central axis and which is substantially normal to at least a portion of a path for transporting the recording medium through the apparatus.*

*65. The apparatus as in claim 55, wherein the developing device includes sleeve means for transporting the toner to said photosensitive member; said sleeve means located between 10° to 90° from said line.*

*66. An apparatus for forming an image on a recording medium which is delivered with the image face down comprising: inserting means for inserting the recording medium into the apparatus, discharging means for discharging said recording medium from the apparatus, transport means for causing the recording medium to be transported along a transport path within the apparatus from said inserting means so as to be discharged therefrom face down at said discharging means; an electrophotographic image forming means including an optical signal generator for producing a signal, a transfer device adjacent said transport path for transferring the image to said recording medium; a fixing device adjacent the transport path for fixing the image on the recording medium and a housing having a top and a plurality of sides being formed with at least two openings therethrough, said housing including a movable portion and a stationary portion, said movable portion being displaceable between open and closed positions so that at least a portion thereof travels generally upwardly and downwardly in a plane which is in a direction substantially parallel to the direction of gravity, said optical signal generator, transfer device and fixing device being disposed in the stationary portion of said housing, said movable portion of said housing, when displaced to its open position, permitting access to the interior of said housing and to said transport path, said inserting means inserting the recording medium into the apparatus through a first of said openings in said housing; said discharging means for discharging said recording medium from the apparatus through a second of said openings in said housing; said first and second of said openings and said movable portion of said housing all being located at the top and one side of said housing, whereby user access during normal use of said apparatus to said inserting means, said discharging means and said movable portion of said housing, and therefore to the interior of said housing and to at least said portion of said transport path, is available at said top and one side of said housing.*

*67. The apparatus as in claim 66, wherein said electrophotographic image forming means further includes a photosensitive member, a charging device for charging the photosensitive member, a developing device for applying toner to the charged photosensitive member, the toner being deposited on the photosensitive member based on the charging of the photosensitive member and a cleaning device for cleaning toner disposed on the photosensitive member after formation of the image on the recording medium, said optical signal generator producing an optical signal representing the image for striking the charged photosensitive member, said transfer device transferring toner deposited on the photosensitive member to the recording medium; said photosensitive member, said charging device, said developing device and said cleaning device being disposed in the stationary portion of said housing.*

*68. The apparatus as in claim 66, wherein said electrophotographic image forming means further includes a photosensitive member rotatable about an axis, said movable portion of said housing being pivotably mounted to said stationary portion for pivoting about an axis parallel to the axis of rotation of said photosensitive member.*

* * * * *